US011453387B1

(12) United States Patent
Huennekens et al.

(10) Patent No.: US 11,453,387 B1
(45) Date of Patent: Sep. 27, 2022

(54) SURFACE CHARACTERIZATION WITH ACTIVE SUSPENSION

(71) Applicant: Zoox, Inc., Foster City, CA (US)

(72) Inventors: Johannes Andreas Huennekens, Los Gatos, CA (US); David Martins Belo, San Francisco, CA (US); Johannes Edren, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 152 days.

(21) Appl. No.: 16/945,548

(22) Filed: Jul. 31, 2020

(51) Int. Cl.
| | |
|---|---|
| *B60W 30/045* | (2012.01) |
| *B60G 17/016* | (2006.01) |
| *B60W 10/04* | (2006.01) |
| *B60W 10/18* | (2012.01) |
| *B60W 10/22* | (2006.01) |
| *B62D 9/00* | (2006.01) |

(52) U.S. Cl.
CPC ....... *B60W 30/045* (2013.01); *B60G 17/0163* (2013.01); *B60W 10/04* (2013.01); *B60W 10/18* (2013.01); *B60W 10/22* (2013.01); *B62D 9/002* (2013.01); *B60G 2202/42* (2013.01); *B60G 2400/0523* (2013.01); *B60G 2400/104* (2013.01); *B60G 2400/106* (2013.01); *B60G 2400/204* (2013.01); *B60G 2400/41* (2013.01); *B60G 2400/82* (2013.01); *B60W 2520/06* (2013.01); *B60W 2520/10* (2013.01); *B60W 2520/26* (2013.01); *B60W 2520/28* (2013.01); *B60W 2520/30* (2013.01); *B60W 2530/10* (2013.01); *B60W 2710/18* (2013.01); *B60W 2710/22* (2013.01)

(58) Field of Classification Search
CPC ............ B60G 17/0163; B60G 2202/42; B60G 2400/104; B60G 2400/106; B60G 2400/204; B60G 2400/41; B60G 2400/82; B60W 10/04; B60W 10/18; B60W 10/22; B60W 30/045; B60W 2520/06; B60W 2520/10; B60W 2520/26; B60W 2520/28; B60W 2520/30; B60W 2530/10; B60W 2710/18; B60W 2710/22; B62D 9/002
USPC .......................................................... 701/37
See application file for complete search history.

(56) References Cited

U.S. PATENT DOCUMENTS

| | | | | |
|---|---|---|---|---|
| 2007/0205881 A1* | 9/2007 | Breed | .................... | B60C 23/041 340/447 |
| 2008/0156406 A1* | 7/2008 | Breed | ................. | B60C 23/0433 152/415 |
| 2008/0216567 A1* | 9/2008 | Breed | .................... | G07C 5/008 73/146.5 |

(Continued)

FOREIGN PATENT DOCUMENTS

JP 2010030378 A * 2/2010

*Primary Examiner* — Atul Trivedi
(74) *Attorney, Agent, or Firm* — Lee & Hayes, P.C.

(57) ABSTRACT

A surface characterization system includes an active suspension a system with a wheel controller to control a first and second wheel of a vehicle where the active suspension causes a difference in loading between the first and second wheel. The wheel controller may cause the first wheel to slow and receive a signal indicative of a change of state of the vehicle. The wheel controller may cause the second wheel to oppose the change of state caused by the first wheel. The surface characterization system may estimate tire-surface parameterization data associated with the first tire and a surface upon which the vehicle is located.

20 Claims, 6 Drawing Sheets

(56) References Cited

U.S. PATENT DOCUMENTS

| | | | |
|---|---|---|---|
| 2015/0039216 A1* | 2/2015 | Czaja | B60W 40/13 |
| | | | 701/124 |
| 2016/0347143 A1* | 12/2016 | Hrovat | B60W 50/14 |
| 2017/0137023 A1* | 5/2017 | Anderson | B60G 17/0195 |
| 2020/0216085 A1* | 7/2020 | Bobier-Tiu | B60W 40/08 |

* cited by examiner

SURFACE CHARACTERIZATION WITH ACTIVE SUSPENSION

BACKGROUND

Vehicles often include a steering system and a braking system for controlling maneuvering of the vehicle. The steering system may be used to maneuver the vehicle along roads, causing the vehicle to travel through curves and provide general maneuverability, and the braking system may be used to slow or stop the vehicle. Used in combination with a powertrain, the steering and braking systems of the vehicle may be used to control the vehicle to maneuver between locations, avoid objects, and park the vehicle once the vehicle has arrived at a destination. However, such maneuvers may be dependent on a friction associated with the road surface. Thus, systems that do not accurately account for the friction (or road-tire interface) may result in error and, potentially, dangerous driving behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
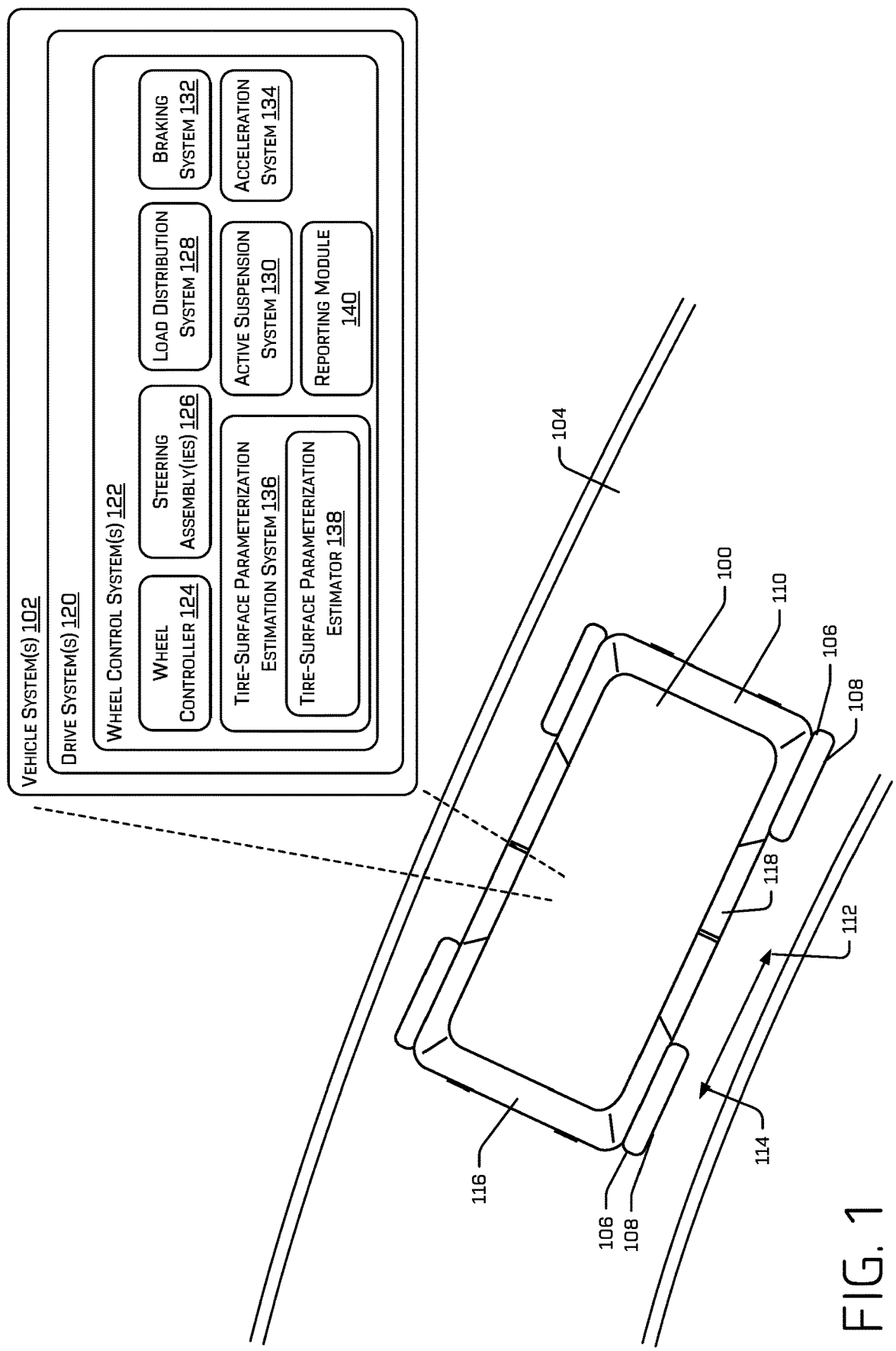
FIG. 1 is an overhead view of an example vehicle including example vehicle systems shown in block diagram form.

As discussed above, a vehicle's steering and braking systems may be dependent on a changing interface between a vehicle (including the vehicle's steering and braking systems) and the road. For example, a friction between a vehicle's tires and the road may impact the vehicle's ability to maneuver or change speeds. However, a system that provides information about the changing interface, for example, how much traction a tire has with the road surface, may enable a vehicle's control system to adjust the vehicle's planned maneuvers or speed through a section of road to maintain safety.

This disclosure relates to estimation of tire-surface parameterization data associated with the surface on which a vehicle is traveling. Tire-surface parameterization data may include, for example, friction-related data (e.g., static and/or dynamic coefficients of friction, including linear and non-linear tire behavior), tire cornering stiffness, side slip force, tire slip angles, or the like. In some examples, the tire-surface parameterization data may be obtained, at least in part, by independently controlling wheels and/or tires of the vehicle to measure a force required to cause one or more tires to lose traction with the road surface. The tire-surface parameterization data may be used to enhance safety, improve control, improve maneuverability, and/or acquisition of information relevant to operation of the vehicle or other vehicles.

In examples, a system may include a wheel controller configured to control a first wheel parameter associated with a first tire and a second wheel parameter associated with a second tire of a vehicle, the first wheel parameter or second wheel parameter including at least one of: a wheel loading, wheel torque, or brake of at least one wheel. In examples, the wheel controller may reduce a first wheel loading associated with the first tire relative to a second wheel loading associated with the second tire to a wheel loading difference threshold, and induce a change of the first wheel parameter associated with the first tire. In examples, the wheel controller is also configured to receive a signal indicative of a change of state of the vehicle, the change of state including at least one of a direction of travel of the vehicle, a speed of the vehicle, a wheel slip, a steering angle of the vehicle, or an instability of the vehicle, and based at least in part on the signal, estimate tire-surface parameterization data associated with the first tire and a surface upon which the vehicle is located. In examples, the wheel controller is further configured to, based at least in part on the signal, induce a change of a wheel parameter associated with the second tire to oppose the change of state of the vehicle.

In examples, the wheel controller is further configured to, based at least in part on the signal, induce a change of a wheel parameter associated with the second tire to offset the change of state of the vehicle to below a passenger perception threshold. In examples, the wheel controller is further configured to, control a third wheel parameter associated with a third tire and a fourth wheel parameter associated with a fourth tire of the vehicle, and based at least in part on the signal, induce a change of the second wheel parameter associated with the second tire, a wheel parameter associated with the third tire, and a wheel parameter associated with the fourth tire to offset the change of state of the vehicle to below a passenger perception threshold.

In examples, the wheel controller is further configured to reduce the first wheel loading to at most 10% of a weight of the vehicle. In examples, the wheel controller is further configured to, reduce the first wheel loading to between ¼ and ½ of a nominal wheel loading when the vehicle is at rest. Such loading may, in some examples as described in detail below, comprise adjusting one or more associated suspension systems in the vehicle to redistribute load in order to meet the desired load of the first wheel parameter.

In examples, the system also includes a brake configured to be coupled to the first tire and to slow rotation of the first tire, a tire-surface parameterization estimator, and a motor configured to be coupled to the second tire and to supply torque to the second tire. In examples, the wheel controller is configured to activate the brake to slow rotation of the first tire, and cause the motor to supply torque to the second tire, to resist at least one of a change of speed or a change of direction of travel of the vehicle caused by activation of the brake. In examples, the tire-surface parameterization estimator is configured to receive a signal indicative of a speed of rotation of the first tire upon activation of the brake, receive a signal indicative of the torque applied to the second tire, and estimate tire-surface parameterization data associated with the first tire and the surface based at least in part on at least one of the signal indicative of a change of state of the vehicle, the signal indicative of the speed of rotation of the first tire, or the signal indicative of the torque applied to the second tire. In the examples, the brake may comprise a torque applied to resist the rotation of the first tire. In examples, the brake may comprise a clamping member, for example, a caliper, applying a frictional force to a rotating member coupled to the first tire, for example, a brake rotor. In examples, a sensor coupled to the first tire, for example, a load cell coupled to the suspension supporting the first tire, to provide a signal indicative of a longitudinal force experienced by the first tire while the brake is applied.

In examples, the wheel controller is further configured to activate the brake to cause the first tire to reach its static friction limit. In examples, the wheel controller is further configured to activate the brake to cause the first tire to stop rotating while the vehicle has a non-zero speed. In examples, the tire-surface parameterization estimator is configured to estimate a coefficient of friction between the first tire and the surface based as least in part on the tire-surface parameterization data.

In examples, the system also includes a brake configured to be coupled to the second tire and slow or prevent rotation of the second tire, a tire-surface parameterization estimator, a motor configured to be coupled to the first tire and supply torque to the first tire, where the wheel controller is configured to activate the brake to slow or prevent rotation of the second tire, and cause the motor to supply torque to the first tire, to cause the first tire to slip relative to the surface. In examples, the tire-surface parameterization estimator is configured to receive a signal indicative of the slip of the first tire relative to the surface upon application of torque from the motor, receive a signal indicative of the torque applied to the first tire sufficient to cause slip of the first tire relative to the surface, and estimate tire-surface parameterization data associated with the first tire and the surface based at least in part on at least one of the signal indicative of a change of state of the vehicle, the signal indicative of the slip of the first tire, or the signal indicative of the torque applied to the first tire.

In examples, the system further includes a reporting module in communication with a communication network and configured to communicate, to one or more of network-based data stores or other vehicles, data correlating a location of the vehicle and the tire-surface parameterization data via the communication network.

In examples, a vehicle includes a chassis including a first end and a second end opposite the first end, a first tire coupled proximate to the first end of the chassis, and a second tire coupled proximate to one of the first end of the chassis or the second end of the chassis. In examples, the vehicle also includes a brake coupled to the first tire and configured to slow rotation of the first tire, a motor coupled to the second tire and configured to supply rotational torque to the second tire to change a speed of rotation of the second tire, and a wheel controller. In examples, the wheel controller is configured to reduce a first wheel loading associated with the first tire relative to a second wheel loading associated with the second tire to a wheel loading difference threshold, activate the brake to slow rotation of the first tire, and cause the motor to supply torque to the second tire to resist at least one of a change of speed or a change in direction of travel of the vehicle caused by activation of the brake. In examples, the vehicle also includes a tire-surface parameterization estimator configured to receive a signal indicative of a speed of rotation of the first tire upon activation of the brake, and based at least in part on the signal, estimating tire-surface parameterization data associated with the first tire and a surface upon which the vehicle is located.

In examples, the tire-surface parameterization estimator is further configured to receive a signal indicative of the torque applied to the second tire, and estimate tire-surface parameterization data associated with the first tire and the surface based at least in part on the signal indicative of the torque applied to the second tire.

FIG. 1 is an overhead view of an example vehicle 100 including example vehicle systems 102 shown in block diagram form. The example vehicle 100 may be a bidirectional (e.g., able to operate substantially similarly in either a "forward" or "reverse" direction) autonomous vehicle configured to travel via a road network 104 from one geographic location to a destination carrying one or more occupants. For the purpose of illustration, the vehicle 100 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) occupant not being expected to control the vehicle at any time. In such examples, because the vehicle 100 may be configured to control all functions from start to completion of the trip, including all parking functions, it may not include a driver and/or controls for driving the vehicle 100, such as a steering wheel, an acceleration pedal, and/or a brake pedal. However, in other examples, the vehicle may be a fully or partially autonomous vehicle having any other level or classification. Moreover, in some instances, the systems described herein may be applicable to non-autonomous and/or non-bidirectional vehicles as well. In examples, the vehicle 100 may be any configuration of vehicle, such as, for example, a van, a sport utility vehicle, a cross-over vehicle, a truck, a bus, an agricultural vehicle, or a construction vehicle, such a vehicle operating according to any level of autonomy (e.g., Level 0 being fully manually operated to Level 5, as indicated above). Also, while examples are given in which the vehicle is a land vehicle, the techniques described herein are also applicable to aerial, marine, and other vehicles.

The vehicle 100 may be powered by one or more internal combustion engines, one or more electric motors, hydrogen power, any combination thereof, and/or any other suitable power sources. Although the example vehicle 100 has four wheels 106 and four tires 108 respectively mounted on the wheels 106, the systems and methods described herein may be incorporated into vehicles having fewer or a greater number of wheels, tires, and/or tracks. The vehicle 100 may have four-wheel steering and may operate generally with equal performance characteristics in all directions, for example, such that a first end 110 of the vehicle 100 is the front end of the vehicle 100 when traveling in a first travel direction 112, and such that the first end 110 becomes the rear end of the vehicle 100 when traveling in the opposite, second travel direction 114, as shown in FIG. 1. Similarly, a second end 116 of the vehicle 100 is the front end of the vehicle 100 when traveling in the second travel direction 114, and such that the second end 116 becomes the rear end of the vehicle 100 when traveling in the opposite, first travel direction 112. These example characteristics may facilitate greater maneuverability, for example, in small spaces or crowded environments, such as urban areas and parking lots.

As shown in FIG. 1, the vehicle 100 includes a chassis 118 coupled to the four wheels 106 and configured to carry and protect the occupants of the vehicle 100 as it travels from a location to a destination via a route on the road network 104. The example vehicle systems 102 of the vehicle 100 include a drive system 120 configured to control maneuvering and/or related operations of the vehicle 100. As shown in FIG. 1, the drive system 120 may include a wheel control system 122 configured to control operations associated with steering the wheels 106 of the vehicle 100. In some examples, the wheel control system 122 may include a wheel controller 124 configured to control operation of one or more steering assemblies 126 coupled to the wheels 106 and chassis 118 of the vehicle 100. For example, the wheel controller 124 may control operation of one or more steering assemblies 126 to change steering angles associated with one or more of the wheels 106. The wheel control system 122 may also include a load distribution system 128 configured to selectively distribute weight of the vehicle to different wheels 106 and/or tires 108. In examples, the load distribution system 128 in coupled to, integrated into, or works along side an active suspension system 130 of the vehicle. In examples, the active suspension system includes an actuator coupled to a suspension subassembly that may include a spring element and/or a damper element. In examples, the actuator selectively moves a portion of the suspension subassembly relative to the vehicle to engage a surface, for example, a road surface.

The example wheel control system 122 may also include a braking system 132 configured to control vehicle operations related to slowing the rotation of one or more wheels 106 of the vehicle 100. In some examples, the braking system 132 may include one or more brakes associated with each of the wheels 106. The brakes, in some examples, may include regenerative braking devices, such as electric machines configured to convert the kinetic energy associated with rotation of the wheels 106 into electric energy. Additionally, or alternatively, the brakes may include a friction braking device, such as a caliper. The example wheel control system 122 also includes an acceleration system 134 coupled to the chassis and configured to cause one of more wheels 106 of the vehicle 100 to provide movement of the vehicle 100, which may include supplying torque to one or more wheels 106 of the vehicle 100. The acceleration system 134 may include one or more electric motors coupled to one or more of the wheels 106. In examples, the acceleration system 134 supplies torque selectively to select wheels in select directions. For example, the acceleration system 134 may apply a torque in a direction to cause a wheel slow or stop, for example, creating a braking effect. In some examples, the load distribution system 128 may incorporate the braking system 132 and/or the acceleration system 134 to selectively distribute the weight of the vehicle 100.

Some examples of the wheel control system 122 may include a system for estimating tire-surface parameterization data 136 associated with the surface on which the vehicle 100 travels (e.g., the road network 104). In some examples, the system for estimating tire-surface parameterization data 136 may include a tire-surface parameterization estimator 138 configured to receive one or more signals from components of the vehicle systems 102 and estimate tire-surface parameterization data associated with the surface on which the vehicle 100 travels. In some examples, the system for estimating tire-surface parameterization data 136 may incorporate one or more aspects of the wheel control system 122, the load distribution system 128, the braking system 132, and/or the acceleration system 134, for example, as described herein. In some examples, the wheel control system 122 may also include a reporting module 140 in communication with a communication network and configured to communicate data correlating the location of the vehicle 100 and the tire-surface parameterization data via the communication network.

Figure 2:
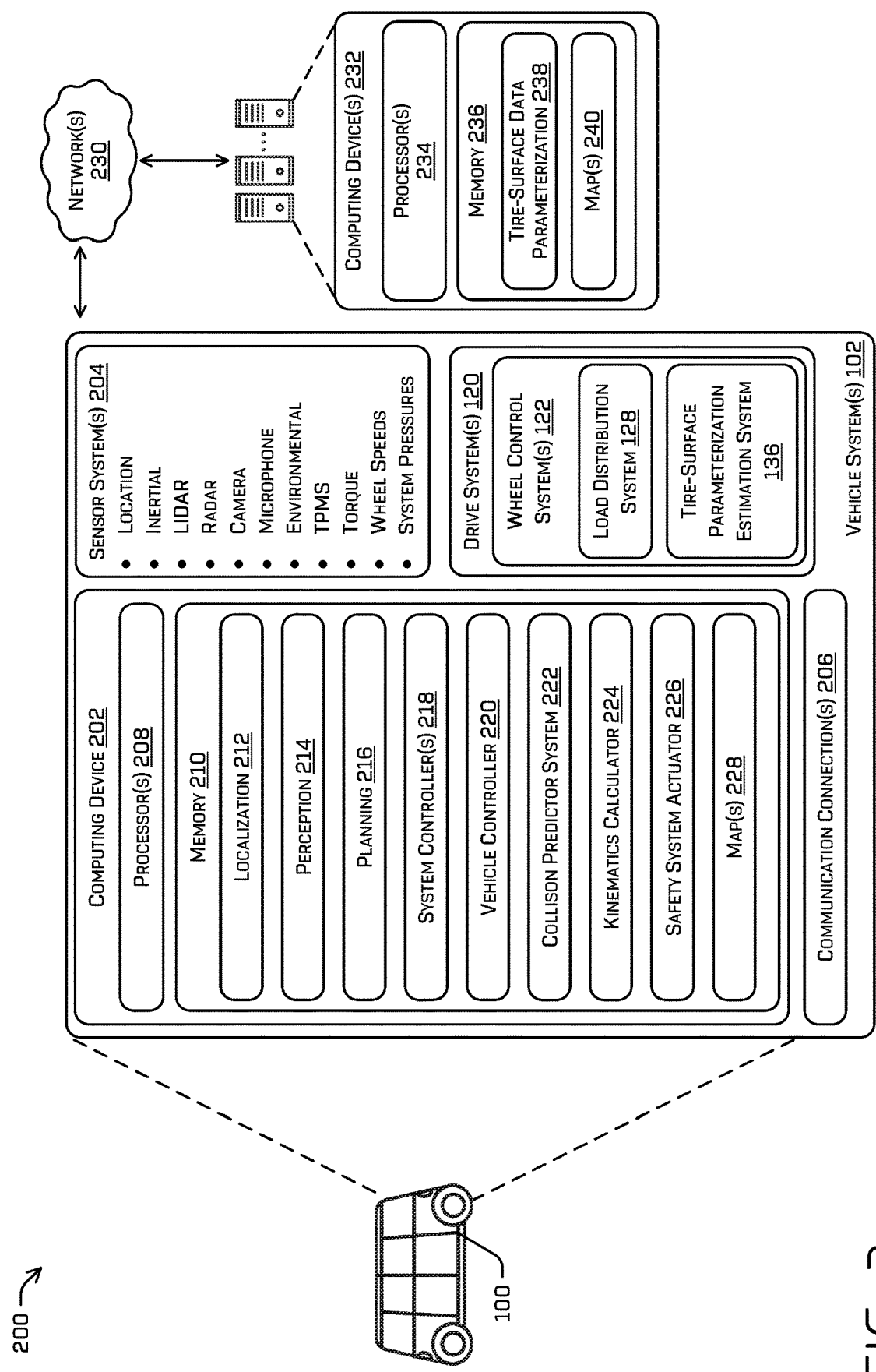
FIG. 2 is a block diagram showing an example architecture for the vehicle systems and an example architecture for a drive system.

FIG. 2 illustrates a block diagram of an example system 200. In at least one example, the system 200 can include a vehicle, for example, vehicle 100 shown in FIG. 1. The system 200 may include vehicle 100 may include vehicle systems 102. In examples, vehicle systems 102 may include a computing device 202, one or more sensor systems 204, and one or more communication connections 206.

The computing device 202 can include one or more processors 208 and memory 210 communicatively coupled with the one or more processors 208. In the illustrated example, the memory 210 of the computing device 202 stores a localization component 212, a perception component 214, a planning component 216, one or more system controllers 218, a vehicle controller 220, a collision predictor system 222, a kinematics calculator 224, and a safety system actuator 226. The memory 210 can also store one or more map(s) 228. Though depicted in FIG. 2 as residing in memory 210 for illustrative purposes, it is contemplated that several of the features, including the tire-surface parameterization and the map(s) 228 and/or other components may additionally, or alternatively, be accessible to the vehicle system(s) 102 (e.g., stored remotely).

In at least one example, the localization component 212 can include functionality to receive data from the sensor system 204 to determine a position and/or pose of the vehicle 100. For example, the localization component 212 can include, request, and/or receive a three-dimensional map of an environment, e.g., from the map(s) 228, and can continuously determine a location and/or orientation of the vehicle 100 within the map, and may provide location data to other portions of the vehicle systems 102. In some instances, the localization component 212 can utilize SLAM (simultaneous localization and mapping) or CLAMS (calibration, localization and mapping, simultaneously) to receive image data, LIDAR data, radar data, SONAR data, IMU data (such as data from gyroscopes and/or accelerometers, magnetometers, and/or cameras for obtaining image data for visual odometry or vision-inertial navigation), GPS data, wheel encoder data, and/or the like to accurately determine a location of the vehicle 100.

In some instances, the perception component 214 can include functionality to perform object detection, segmentation, and/or classification. In some examples, the perception component 214 can provide processed sensor data that indicates a presence of an entity that is proximate to the vehicle 100 and/or a classification of the entity as an entity type and/or label the entity (e.g., car, truck, bicycle, motorcycle, pedestrian, cyclist, particulate matter, building, animal, tree, bush, road surface, curb, sidewalk, lamppost, road sign, signpost, unknown, the like, in addition to, navigable surface, free space, drivable surface, or otherwise).

In additional and/or alternative examples, the perception component 214 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (e.g., size), etc. Characteristics associated with the environment can include, but are not limited to, a presence of another entity in the environment, a state of another entity in the environment, a time of day, a day of a week, a season, a weather condition, an indication of darkness/light, etc.

In examples, the planning component 216 is configured to generate data representative of a trajectory of the vehicle 100, for example, using data representing a location of the vehicle 100 in the environment and other data, such as local pose data that may be included in location data, environmental data (for example, ambient conditions), and/or tire-surface parameterization data (for example, coefficients of friction). In some examples, the planning component 216 may also be configured to determine projected trajectories predicted to be executed by the vehicle 100. The planning component 216 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planning component 216 may be configured to predict more than a single predicted object trajectory. For example, the planning component 216 may be configured to predict multiple object trajectories based on, for example, probabilistic determinations or multi-modal distributions of predicted positions, trajectories, and/or velocities associated with an object.

In examples, the planning component 216 may use the tire-surface parameterization in predicting motions and/or paths of the vehicle and/or objects. In examples, the planning component 216 may predict a first predicted vehicle path when a first tire-surface parameterization value is present and a second predicted vehicle path with a second tire-surface parameterization value is present. In some examples, the first and second predicted vehicle paths may be significantly different depending on the difference between the first and second tire-surface parametrization values. In examples, the planning component 216 may use the tire-surface parameterization in predicting motions and/or paths of the vehicle and/or objects. In examples, the planning component 216 may extrapolate the tire-surface parameterization value of the vehicle to influence the prediction of a first predicted object path when a first tire-surface parameterization value is present and a second predicted object path when a second tire-surface parameterization value is present. In examples, using the tire-surface parameterization, a collision between the vehicle and the object may be predicted and addressed where a collision would otherwise not have been predicted.

In some examples, the collision predictor system 222 may be configured to use the predicted object behavior, the data representing the object type, the data representing the trajectory of the object, and/or the data representing the trajectory of the vehicle 100, to predict a collision between the vehicle 100 and the object.

In some examples, the kinematics calculator 224 may be configured to determine data representing one or more scalar and/or vector quantities associated with motion of objects in the environment, including, but not limited to, velocity, speed, acceleration, momentum, local pose, and/or force. As discussed above, tire-surface parameterization data may be extrapolated and used by the kinematics calculator 224 to inform the predicted movement of an object. Data from the kinematics calculator 224 may be used to compute other data, including, but not limited to, data representing an estimated time to impact between an object and the vehicle 100, and data representing a distance between the object and the vehicle 100. In some examples, the planning component 216 may use data produced by the kinematics calculator 224 to estimate predicted object data. For example, the planning component 216 may use current scalar and/or vector quantities associated with an object to determine a likelihood that other objects in the environment (e.g., cars, motorcyclists, pedestrians, bicyclists, and animals) are moving in an alert or controlled state, versus an un-alert or uncontrolled state. For example, the kinematics calculator 224 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment and/or environmental conditions (for example, surface conditions/available traction). For example, if the objects are moving erratically or without appearing to adjust to the presence or motion of other objects in the environment, this may be an indication that the objects are either uncontrolled or moving in an unpredictable manner. Additionally, if the objects are moving without appearing to adjust to the presence or motion of other objects in the environment and the tire-surface parametrization value expected by the vehicle is low, this may be an indication that the objects are moving in an uncontrolled, but predictable manner This may be inferred based on sensor data received over time that may be used to estimate or predict a future location of the object relative to a current or future trajectory of the vehicle 100.

In some examples, the safety system actuator 226 may be configured to activate one or more safety systems of the vehicle 100 when a collision is predicted by the collision predictor system 222 and/or the occurrence of other safety related events, such as, for example, an emergency maneuver by the vehicle 100, such as hard braking or a sharp acceleration. The safety system actuator 226 may be configured to activate an interior safety system (e.g., tensioning seat belts, deploying air bags, deploying curtains, providing audible alerts, and the like), an exterior safety system (e.g., including warning sounds and/or warning lights), the drive system 120, which may be configured to execute an emergency maneuver to avoid a collision, and/or any combination thereof. For example, the drive system 120 may receive data for causing the wheel control system 122 of the vehicle 100 to change the travel direction of the vehicle 100, and an acceleration system of the vehicle 100 to change the speed of the vehicle 100 to alter the trajectory of vehicle 100 from an initial trajectory to a trajectory for avoiding a collision.

Some examples of the vehicle systems 102 may operate according to the following example. Data representing a trajectory of the vehicle 100 in the environment may be received by the drive system 120. Object data associated with an object in the environment may be calculated. Sensor data from one or more of the sensor system(s) 204 may be used to calculate the object data. The object data may include data representing the location of the object in the environment, an object track associated with the object, such as whether the object is stationary or moving, and an object classification associated with the object, such as whether the object is another vehicle, a pedestrian, a bicyclist, an animal, or a stationary object. In some examples, the perception component 214, based on the object data, may be used to determine data representing the object's location in the environment, data representing whether the object is moving, and data representing a classification associated with the object.

In some examples, the planning component 216 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 222 may be used to predict a collision between the vehicle 100 and an object in the environment based on the object type, whether the object is moving, the trajectory of the vehicle 100, the predicted path of the object obtained from the planning component 216. For example, a collision may be predicted based in part on the object type due to the object moving, the trajectory of the object being in potential conflict with the trajectory of the vehicle 100, and the object having an object classification that indicates the object is a likely collision threat. In some examples, such a collision prediction may also be based on a predicted object behavior. In some examples, each classification, or sub-classification, of objects may have a corresponding associated behavior. For example, a predicted behavior of a bicyclist is to travel in relatively straight lines having a maximum speed.

In some examples, the safety system actuator 226 may be configured to actuate one or more portions of a safety system of the vehicle 100 when a collision is predicted. For example, the safety system actuator 226 may activate one or more of the interior safety systems, one or more of the exterior safety systems, and one or more of the components of the drive system 120 (e.g., the wheel control system 122, the braking system 132, and/or the acceleration system 134) via the vehicle controller 220. In some examples, the vehicle controller 220 may determine that the interior safety system will be activated based on some action of an object in the environment, and the vehicle control data may include information configured to cause the vehicle controller 220 to activate one or more functions of the interior safety system, the exterior safety system, and the drive system 120.

The map(s) 228 can be used by the vehicle 100 to determine a location and/or navigate within the environment, when, for example, the platform is a vehicle. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In some examples, the map(s) 228 can include at least one map (e.g., images and/or a mesh). The vehicle 100 can be controlled based at least in part on the map(s) 228.

That is, the map(s) 228 can be used in connection with the localization component 212, the perception component 214, the planning component 216, and/or the vehicle controller 220 to determine a location of the vehicle 100, identify objects in an environment, and/or generate routes and/or trajectories to navigate within an environment.

In examples, the vehicle controller 220 is configured to receive vehicle control data, and based on the vehicle control data, communicate with the drive system 120, which may include one or more of the wheel control system 122, the wheel controller 124, the one or more steering assemblies 126, the load distribution system 128, the braking system 132, the acceleration system 134, the system for estimating tire-surface parameterization data 136, the tire-surface parameterization estimator 138 to control operation of the vehicle 100. For example, the vehicle control data may be based at least in part on data received from one of more of the sensor system(s) 204 and one or more of the planning component 216, the perception component 214, the collision predictor system 222, the kinematics calculator 224, and the safety system actuator 226, and control operation of the drive system 120, to execute operation and maneuvering of the vehicle 100.

In examples, the sensor system(s) 204 are configured to sense movement of the vehicle 100 through the environment, sense environmental data, such as the ambient temperature, pressure, and humidity, and/or sense objects in the environment surrounding the vehicle 100. In some examples, the sensor system(s) 204 may include sensors configured to identify a location on a map.

In at least one example, the sensor system(s) 204 can include light detection and ranging sensors (LIDAR), radio detection and ranging sensors (RADAR), time-of-flight sensors, ultrasonic transducers, sound navigation and ranging sensors (SONAR), location sensors (e.g., GPS, compass, etc.), inertial sensors (e.g., inertial measurement units, accelerometers, magnetometers, gyroscopes, etc.), cameras (e.g., RGB, IR, intensity, depth, stereo, time of flight, etc.), microphones for sensing sounds in the environment, such as sirens from law enforcement and emergency vehicles, wheel encoders, environment sensors (e.g., temperature sensors, humidity sensors, light sensors, pressure sensors, etc.), etc. Other sensors may include a speed sensor related to the operation of the vehicle, operation of the wheels, operation of active suspension, and/or operation of systems of the vehicle. Other sensors may include sensors related to operation of internal combustion engines and/or electric motors related to the horsepower, torque, power creation, power consumption, power transmission, efficiency, electromotive forces ("EMF"), back EMF, voltages, electric currents, and/or other aspects of the engines and/or motors. Other sensors may include sensors related to the tires, for example, tire pressure monitoring systems, to detect tire temperature, tire pressure, and/or tread depth. Other sensors may include brake-related sensors for detecting brake temperatures and/or wear, and in vehicles having regenerative braking, sensors for detecting parameters related to operation of the regenerative braking system. Other sensors may include load and/or force sensors related to loads experienced by different components of the vehicle, including weight distribution on individual wheels, longitudinal, transvers, vertical, and/or axial forces applied to individual wheels and/or suspension components. The sensor system(s) 204 may also include, for example, inertial measurement units (IMUs), accelerometers, gyroscopes, and magnetometers. The sensor system(s) 204 may be configured to provide sensor data representative of the sensed objects and signals to the vehicle systems 102 via, for example, an input/output (I/O) interface. Other types of sensors and sensor data are contemplated.

The sensor system(s) 204 can include multiple instances of each of these or other types of sensors. For instance, the LIDAR sensors (and/or radar sensors) can include individual LIDAR sensors (or radar sensors) located at the corners, front, back, sides, and/or top of the vehicle 100. As another example, the camera sensors can include multiple cameras disposed at various locations about the exterior and/or interior of the vehicle 100. The sensor system(s) 204 can provide input to the computing device 202. Additionally, or alternatively, the sensor system(s) 204 can send sensor data, via one or more networks 230, to one or more remote computing devices at a particular frequency, after a lapse of a predetermined period of time, in near real-time, etc.

In some examples, the sensor system(s) 204 can be active sensor systems, e.g., that include controls for actively adjusting parameters thereof. For example, some cameras may have adjustable shutter speed or exposure time. Similarly, time-of-flight sensors, LiDAR sensors, radar sensors, and the like may have actively adjustable intensity and/or gain attributes. In some implementations, the semantic segmentation information may be further used to adjust one or more settings of the sensor. For example, when the semantic segmentation information identifies a certain class of type of object in the environment of a sensor, the sensor can be adjusted to optimize sensing of that object. For instance, when certain objects that are expected to have an expected color or brightness are identified from the semantic segmentation information, the intensity of emitted light can be adjusted to optimize sensing.

The processor(s) 208 of the vehicle 100 can be any suitable processor capable of executing instructions to process data and perform operations as described herein. By way of example and not limitation, the processor(s) 208 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 210 is an example of non-transitory computer-readable media. The memory 210 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 2 is illustrated as a distributed system, in alternative examples, components of the vehicle 100 can be associated with remote computing devices accessible via the network(s) 230. For example, the vehicle 100 can send sensor data to one or more computing device(s) 232, via the network(s) 230. In some examples, the vehicle 100 can send raw sensor data to the computing device(s) 232. In other examples, the vehicle 100 can send processed sensor data and/or representations of sensor data to the computing device(s) 232. In some examples, the vehicle 100 can send sensor data to the computing device(s) 232 at a particular frequency, after a lapse of a predetermined period of time, in near real-time, etc. In some cases, the vehicle 100 can send sensor data (raw or processed) to the computing device(s) 232 as one or more log files.

The computing device(s) 232 can receive the sensor data (raw or processed) and can perform data reduction operations on the data based at least on sensor calibration data. In at least one example, the computing device(s) 232 can include one or more processors 234 and memory 236 communicatively coupled with the processor(s) 234. In the illustrated example, the memory 236 of the computing device(s) 232 stores a tire-surface data parameterization component 238 and/or map(s) 240. The tire-surface data parameterization component 238 can include functionality to perform operations similar to those discussed above in the context of the system for estimating tire-surface parameterization data 136, and the map(s) 240 may correspond to the map(s) 228. In some instances, the processor(s) 234 and the memory 236 can include functionality and/or structure similar to that discussed above with respect to the processor(s) 208 and the memory 210. In examples, the tire-surface data parameterization component 238 may contain and distribute tire-surface data parameterization information for the vehicle 100, for other vehicles, for areas associated with locations contained in map(s) 228, 240, weather conditions, among others, and the like.

Figure 3A:
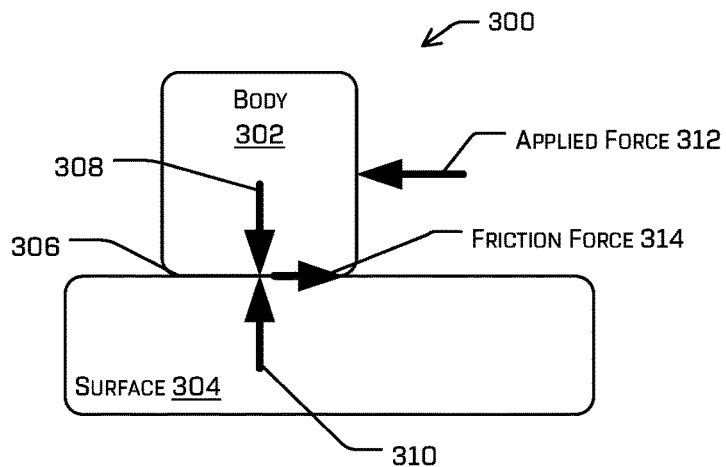
FIG. 3A is a schematic representation of example force interactions between two bodies.

FIG. 3A shows a schematic diagram of an illustrative interaction between two surfaces. For example, FIG. 3A shows a surface interaction system 300 with body 302 disposed on surface 304 meeting at interface 306. In examples, body 302 applies a force 308 towards surface 304 through interface 306. In examples, surface 304 applies a reactionary force 310 to match for 308. In examples, the force 308 may be based on a weight of the body 302, an external force transmitted through the body 302 in the direction of the surface 304, or combinations thereof. In examples, the reactionary force 310 may be normal force applied to the body in a perpendicular direction with respect to the interface 306. In examples, an applied force 312 may be applied to the body 302 in a direction that is substantially not colinear to the direction of force 308. In examples, the surface 304 may provide another reactionary force, for example, friction force 314. In examples, the friction force 314 is applied in a direction parallel to the interface 306. In examples, the friction force 314 may be equal to a coefficient of friction multiplied by the reactionary force 310. In examples, the coefficient of friction may be a static or a dynamic friction coefficient depending on whether the body 302 is stationary or moving (e.g., slipping or sliding) relative to the surface 304 across the interface 306 respectively.

Figure 3B:
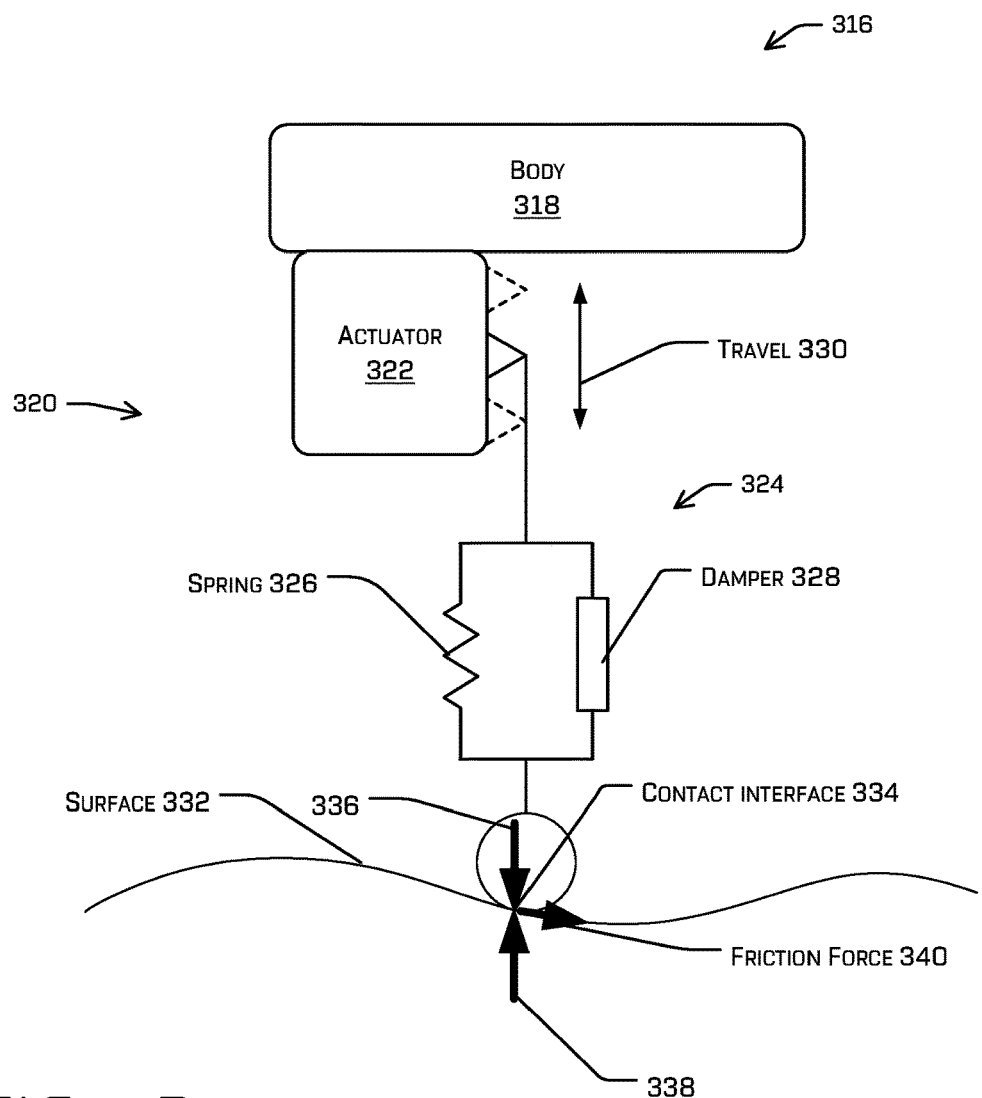
FIG. 3B is a schematic representation of an illustrative suspension system interacting with a surface.

FIG. 3B shows a schematic diagram of an illustrative suspension system interacting with a surface. For example, FIG. 3B shows a suspension 316 comprising a body 318 coupled to an active suspension system 320. In examples, the active suspension system 320 comprises an actuator 322 coupled to a suspension subassembly 324. In examples, the suspension sub assembly comprises a spring element 326 and/or a damper element 328. In examples, the actuator 322 selectively moves a portion of the suspension subassembly 324 across a travel distance 330. In examples, the suspension subassembly 324 engages a surface 332 through a contact interface 334. In examples, the suspension 316 applies a force 336 to the surface 332 through the contact interface 334 causing the surface 332 to apply a reaction or normal force 338. In examples, the contact interface 334 may comprise a tire coupled to the suspension subassembly 324. In examples, the actuator 322 is coupled to a control system that controls the movement of the actuator. In examples, the movement of the actuator 322 affects the force 336 applied to the surface 332 through contact interface 334 and the resulting reaction or normal force 338. In examples, a friction force 340 may be created at the contact interface 334. In examples, the relationship between the friction force 340 and the force 336 and/or the reaction or normal force 338 is characterized as by a coefficient of friction according to equation 1.

$$F_f = \mu F_N \quad (1)$$

where $F_f$ is the friction force 340, $\mu$ is the coefficient of friction, and $F_N$ is the reaction or normal force 338. In examples, where $F_f$ and $F_N$ are known or measured, the coefficient of friction $\mu$ can be determined or estimated.

In examples, the body 318 is supported by a plurality of actuators and suspension subassemblies. In examples, when one of the actuators, for example, actuator 322 moves the portion of the suspension subassembly 324 away from the surface 332 while the other actuators and suspension subassemblies are held static or move away from the surface 332 less than the suspension subassembly 324, the force 336 applied to the surface 332 is reduced relative to holding the portion of the suspension subassembly 324 in a static position thereby reducing the reaction or normal force 338. In examples, when the actuator 322 moves the portion of the suspension subassembly 324 towards the surface 332 while the other actuators and suspension subassemblies are held static or move towards the surface 332 less than the suspension subassembly 324, the load applied to the surface 332 is increased relative to holding the portion of the suspension subassembly 324 in a static position thereby increasing the reaction or normal force 338. In examples, by controlling the movement of the portion of the suspension subassembly 324, the actuator 322 may control the force 336 and the reaction or normal force 338 and thereby control the friction force 340 experienced at the contact interface 334.

Figure 4:
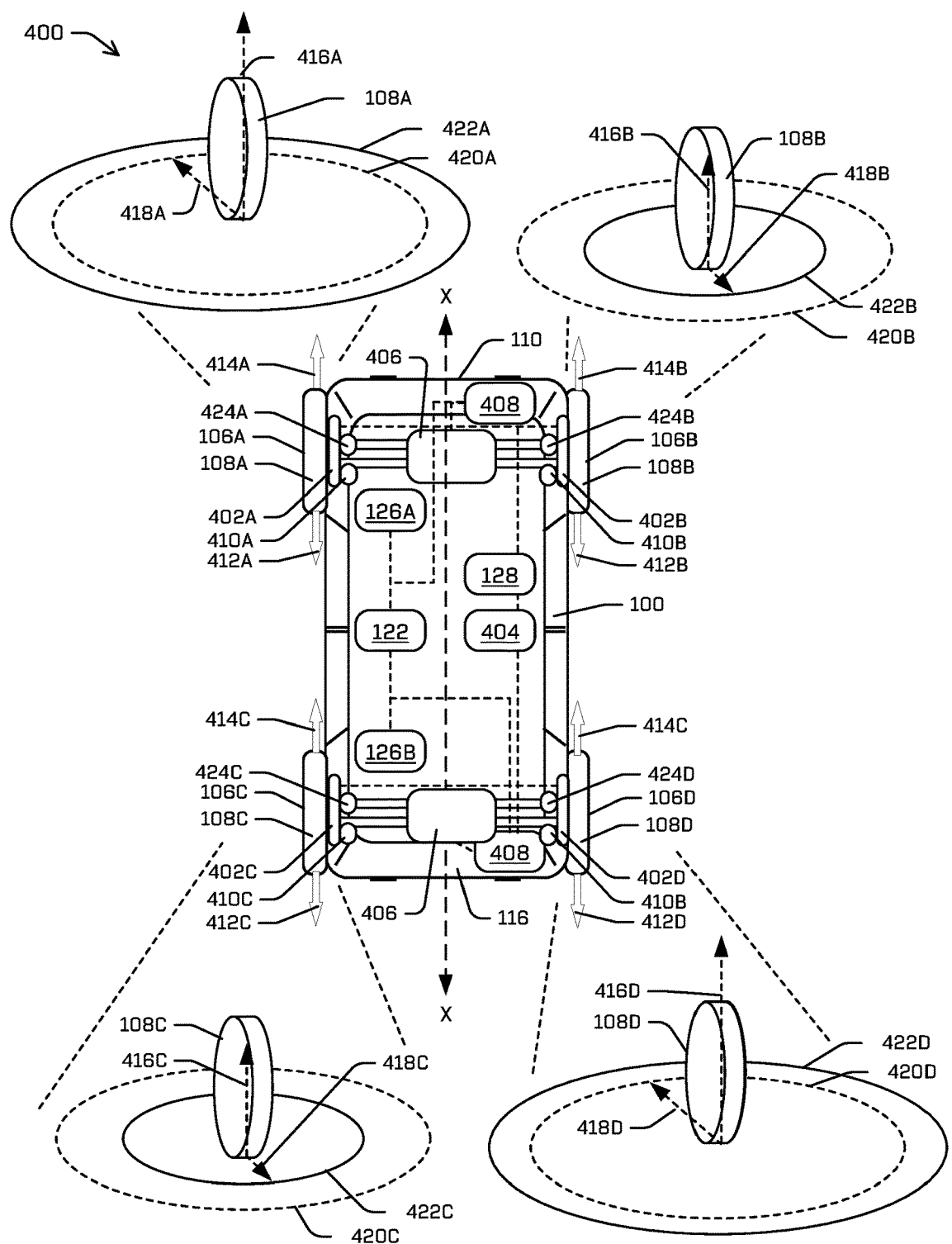
FIG. 4 is a schematic overhead view of an example vehicle performing an example method for estimating tire-surface parameterization data associated with the surface on which the vehicle is traveling.

FIG. 4 is a schematic overhead view of an example vehicle 100 including an example system for estimating tire-surface parameterization data 238 (see FIGS. 1 and 2) associated with a surface on which the vehicle 100 is traveling in an example environment 400. As shown in FIG. 4, some examples of the system for estimating tire-surface parameterization data 136 may incorporate one or more of the wheel control system 122, first and second steering assemblies 126A and 126B, the load distribution system 128, the braking system 132 including brakes 402A and 402B configured to be coupled to the respective first wheels 106A and 106B, and brakes 402C and 402D configured to be coupled to the respective second wheels 106C and 106D. For example, the braking system 132 may also include a braking controller 404 configured to control operation of each of the brakes 402A-402D. In some examples, the braking controller 404 may be configured to control activation of one or more of the brakes 402A-402D independently of one another. In some examples, the braking controller 404 may be configured to activate one or more of the brakes 402A and 402B to cause rotation of one or more the first wheels 106A or 106B to slow or stop, and/or to activate one or more of the brakes 402C and 402D to cause rotation of one or more the second wheels 106C or 106D to slow or stop. Some examples of the vehicle 100 may also include an acceleration system 134. The acceleration system 134 may include one or more motors 406 coupled to the first wheels 106A and 106B and/or one or more motors 406 coupled to the second wheels 106C and 106D, and a motor controller 408 configured to cause the motor(s) 406 to supply torque to one or more of the first wheels 106A and 106B and/or one or more of the second wheels 106C or 106D.

In examples, the load distribution system 128 including actuators 410A, 410B, 410C, or 410D may be configured to actuate actuators 410A, 410B, 410C, or 410D to move or actuate to cause an increase or decrease in a load on one or more of the tires 108A, 108B, 108C, or 108D selectively. In examples, the wheel control system 122 may be configured to activate one of the brakes 402A, 402B, 402C, or 402D to cause rotation of one of the tires 108A, 108B, 108C, or 108D to slow, and cause the one or more motors 406 to supply torque to another one or more of the tires 108A, 108B, 108C, or 108D to resist slowing of the vehicle 100 caused by activation of the brake 402A, 402B, 402C, or 402D. For example, the wheel control system 122 may be configured to activate one or more actuators 410 to reduce a loading on tire 108B and to activate the brake 402B to cause rotation of the associated tire 108B to slow, and cause the one or more motors 406 to supply torque to another one or more of the tires 108A, 108C, or 108D to provide forward-acting forces 414A-414D to resist slowing of the vehicle 100 caused by activation of the brake 402B.

FIG. 4 shows additional views of tires 108A, 108B, 108C, and 108D with representative loading forces 416A, 416B, 416C, and 416D (collectively loading force 416) and representative reaction forces 418A, 418B, 418C, and 418D (collectively reaction force 418). FIG. 4 also shows representative motor force limits 420A, 420B, 420C, and 420D (collectively motor force limits 420) and representative friction force limits 422A, 422B, 422C, and 422D (collectively friction force limits 422). In examples, the friction force limit 422 is affected by the loading force 416. For example, with other factors equal, when the loading force 416 increases, the friction force limit 422 increases. In examples, with other factors equal, when the loading force 416 decreases, the friction force limit 422 decreases. In examples, the reaction forces 418 is affected by the forces applied by a tire to the ground that provides the reaction force 418. For example, a tire 108 may be influenced by one or more of a force from a brake 402, a torque from a motor 406, or a loading from an actuator 410. In examples, the net influences on tire 108 by the vehicle cause the reaction force.

In examples, appropriate combinations of braking and torque may be provided so as not to incur a yaw of the vehicle. In examples, appropriate combinations of braking and torque may be provided so as not to incur an acceleration or jerk of the vehicle. In examples, appropriate combinations of braking and torque may be provided so keep an acceleration of the vehicle below an acceleration threshold. In examples, the acceleration threshold is below 3 m/s2. In examples, the acceleration threshold is between 3 m/s2 and 4.5 m/s2. In examples, the acceleration threshold is between 4.5 m/s2 and 6 m/s2. In examples, appropriate combinations of braking and torque may be provided so keep a jerk of the vehicle 100 below a jerk threshold. In examples, the jerk threshold is below 0.25 m/s3. In examples, the jerk threshold is between 0.25 m/s3 and 0.35 m/s3. In examples, the jerk threshold is between 0.35 m/s3 and 0.5 m/s3. In examples, the jerk threshold is between 0.5 m/s3 and 1.0 m/s3. In examples, the jerk threshold is between 1.0 m/s3 and 2.0 m/s3. In examples, the jerk threshold is between 2.0 m/s3 and 2.5 m/s3.

In examples, the wheel control system 122 may also include a tire-surface parameterization estimator 138 (see FIGS. 1 and 2) configured to receive one or more signals indicative of loading forces 416A, 416B, 416C, and 416D of the tires 108A, 108B 108C, and 108D, one or more signals indicative of a speed of rotation of tires 108A, 108B, 108C, and 108D during braking, to receive one or more signals indicative of the torque of the tires 108A, 108B, 108C, and 108D, and/or receive one or more signals indicative of the braking forces 412B and 412C on the tires 108B and 108C during the braking. In examples, load sensors 424B and 424C may be coupled to tires 108B and 108C respectively to measure braking forces 412B and 412C respectively. Based at least in part on one or more signals indicative of the one or more signals indicative of the loading of tires 108A, 108B, 108C, and 108D, one or more of the signals indicative of the speed of rotation of tires 108A, 108B, 108C, and 108D, one or more signals indicative of the torque of the tires 108A, 108B, 108C, and 108D, and/or indicative of the braking force on the tires 108B and 108C, the tire-surface parameterization estimator 138 may be configured to estimate tire-surface parameterization data associated with the surface. In some examples, the tire-surface parameterization data may include a friction coefficient (e.g., a static or a dynamic friction coefficient) between the surface and one or more tires 108 of the vehicle 100. In some examples, the brakes 402 may include one or more brakes that are part of a regenerative braking system.

FIG. 4 shows an example where the loading forces 416B on tire 108B and 416C on tire 108C are reduced relative to loading forces 416A and 416D on tires 108A and 108D. In this example, brakes 402B and 402C are applied to tires 108B 108C respectively while torque is increased tires 108A and 108D, for example, to offset the drag caused by tires 108B and 108C. In this example, a torque from tires 108A and 108D, rotation rates of tires 108B and 108C, braking forces from brakes 402B and 402C may be used to determine reaction forces 418B and 418C. In examples, the tire-surface parameterization estimator 138 may use the determined reaction forces 418B and 418C with loading forces 416B and 416C to determine a tire-surface parameter, for example a coefficient of friction. In examples, the tires 108B and 108C may continue to rotate during the test. In examples, the tires 108B and 108C may stop spinning or be locked up during the test.

In examples, the vehicle 100 may be in motion relative to the surface, for example on road network 104. In other examples the vehicle 100 may be stationary relative to the surface. For example, the loading force 416B on tire 108B is reduced relative to loading forces 416A, 416C, and 416D on tires 108A, 108C, and 108D. In this example, torque is applied to tire 108B causing a reaction force in a first direction, while torque is applied to tires 108A, 108C, and 108D in a second direction, opposite the first direction, for example, to offset the force caused by tire 108B. In this example, a torque from tires 108A, 108C, and 108D, a rotation rate of tire 108B, a torque from motor 406 may be used to determine reaction force 418B. In examples, the tire-surface parameterization estimator 138 may use the determined reaction force 418B with loading force 416B to determine a tire-surface parameter, for example a coefficient of friction. In examples, the tire 108B may continue to rotate during the test. In examples, appropriate combinations of offsetting torques may be provided so as not to incur an acceleration or jerk of the vehicle.

In examples, more than one tire 108 may be tested at a time. For example, in addition to tire 108B being tested, the wheel control system 122 may also cause tire 108C to be tested along with tire 108B. In examples, when two or more tires are tested at the same time, testing diagonal pairs of tires may be desired. For example, tires 108A and 108D may be tested together while tires 108B and 108C may be tested together.

In examples, the wheel control system 122 may rotate between the tires 108 when testing. In examples, by rotating which tire is tested, the wheel control system 122 may even out the added wear caused on the tire by the test. In examples, where the tire is locked up, minor localized damage or uneven wear may occur on the tire that may impact the roundness, smoothness, consistency, and/or useful life of the tire. In examples, by using different tires to determine the tire-surface parameter may even out the wear and prolong the life of the tires.

In examples, the tire-surface parameterization estimation system 136 may use known or determined characteristics of the tires. For example, the tires may have a known tire-surface parameter characteristic for certain conditions. In examples, the tire-surface parameterization estimation system 136 uses this relationship to calibrate the system relative to the tires. In examples, the tires may have a first coefficient of friction when contacting a first surface in a first condition (for example, dry concrete), a second coefficient of friction when contacting a second surface in the first condition (for example, dry dirt), a third coefficient of friction when contacting the first surface in a second condition (for example, wet concrete), and a fourth coefficient of friction when contacting the second surface in the second condition (for example, wet dirt/mud). In examples, these tire-surface parameter characteristics may be based on testing and/or measurements, characteristics of the surface, and/or may be based on extrapolated data. In examples, tire-surface parameter characteristics may be provided by the tire manufacturers. In examples, the tire-surface parameter characteristics may be determined prior to or after the tires are installed on a vehicle. For example, a vehicle may perform a test on a calibrated surface to determine one or more of the surface parameter characteristics. For example, a vehicle may perform a coefficient of friction calibration test on a surface with certain surface characteristics resulting in a known coefficient of friction. In examples, the vehicle performs a calibration test on multiple calibration surfaces. In examples, the multiple calibration surfaces provide different coefficients of friction. In examples, the calibration surfaces may be used in a controlled environment (for example, inside a climate controlled facility). In examples, the calibration surfaces may be used in an uncontrolled environment. In examples, environmental conditions present during calibration testing are factored into the calibration. For example, if the calibration surface is outside, the ambient temperature, the tire temperature, the surface temperature, the humidity, the surface condition (e.g., dry, wet, frozen, etc), among other factors may be considered and taken into account during the calibration.

In examples, during normal operation of the vehicle, the tire-surface parameterization estimation system 136 uses the calibration factors, as well as information collected during the test to determine the tire-surface parameter. For example, the tire-surface parameterization estimation system 136 receives information from a test indicating the relative loading of the wheels, rotation rates of the wheels, torques applied to the wheels, orientations of the wheels (e.g., camber angles, toe-angle, caster-angle, steering angles, etc.), and/or inertial measurements of the vehicle (e.g., speed, acceleration, direction/orientation of movement relative to the wheels), among other data. In examples, the tire-surface parameterization estimation system 136 determines the normal force based at least in part on the relative loading and orientations of the wheels, and the friction force based at least in part on the rotation rates of the wheels, the torques applied to the wheels, and the motion of the vehicle relative to the wheels. In this example, the ratio between the normal force and the friction force may be used to determine tire-surface parameter (e.g., coefficient of friction).

In examples where a brake system using a braking caliper and rotor system is used, an axial force measurement may also be used to determine the friction force. In examples, the accuracy of the friction force may be increased when using the axial force measurement where braking calipers and rotors are used when compared to systems where motor torques are selectively applied to wheels to slow a wheel rotation.

Some examples of the system for estimating tire-surface parameterization data may also include a reporting module 140 (see FIGS. 1 and 2) in communication with a communication network. The reporting module 140 may be configured to receive one or more signals from the localization component 212 (see FIG. 2) and communicate data correlating the location of the vehicle 100 and the tire-surface parameterization data via the communication network.

In some examples, the tire-surface parameterization data may be communicated to, for example, the vehicle controller 220, which may cause one or more of the vehicle systems 102 to operate based at least in part on the tire-surface parameterization data. For example, the performance envelopes of one or more of acceleration, braking, and/or steering may be modified based at least in part on the tire-surface parameterization data, for example, to reduce the acceleration rates, braking rates, and/or steering rates in relatively lower friction situations, or raise the acceleration rates, braking rates, and/or steering rates in relatively higher friction situations. In some examples, suspension compliance and/or tire pressures may be adjusted based at least in part on the tire-surface parameterization-related data.

In examples, the tire-surface parametrization data is provided to other vehicles. For example, vehicles in a fleet may share tire-surface parameterization data. In examples, a vehicle may take into account tire-surface parameterization data when planning a route. For example, a tire-surface parameterization value for a given location and environmental condition may be weighted when determining a route. For example, a relatively slippery condition observed on a clear day may be weighted more heavily than a similar slippery condition observed on a stormy day when determining a route on a clear day. In examples, the data may be incorporated with other information when planning a route, including, but not limited to traffic, weather conditions, type of road surface, length of road with associated tire-surface parameter, length and conditions of alternative routes.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

As discussed above, the example system 200 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The system 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

In some instances, aspects of some or all of the components discussed herein may include any models, algorithms, and/or machine learning algorithms. For example, in some instances, the components in the memory 210 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet30, ResNet101, VGG, DenseNet, PointNet, and the like.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all the software components may execute in memory on another device and communicate with the illustrated system 200. Some or all the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the system 200 may be transmitted to the system 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 100 is discussed below. It should be appreciated that any examples described herein may be performed in sequence, substantially simultaneously, and repeatedly, and/or in no particular order.

Figure 5:
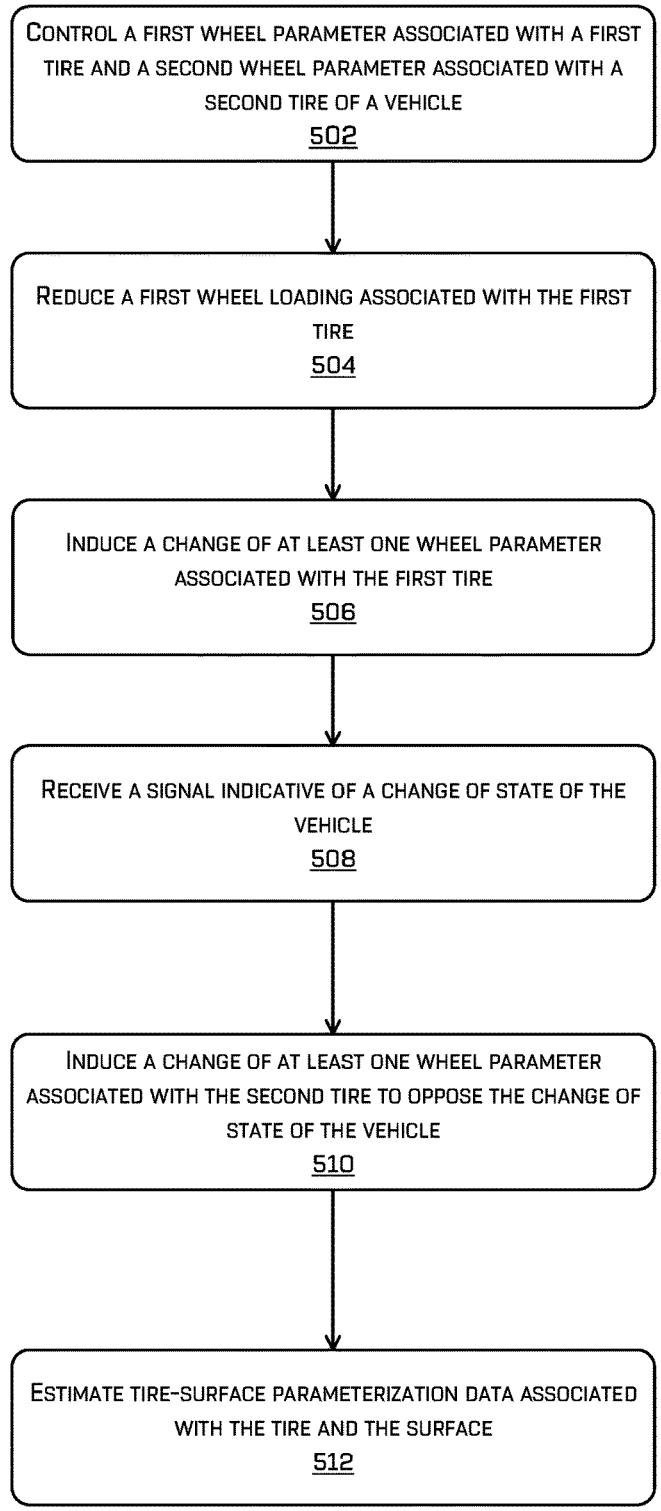
FIGS. 5 and 6 are flow diagrams of example processes for estimating tire-surface parameterization data associated with the surface on which the vehicle is traveling.
Figure 6:
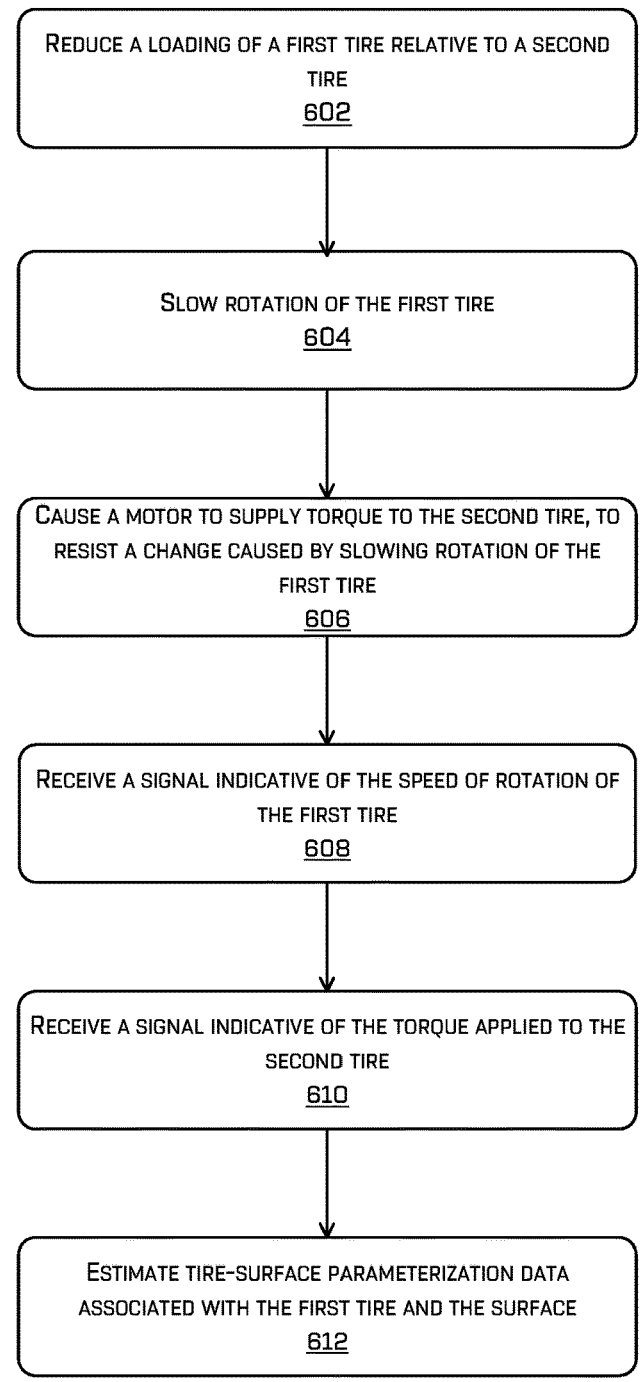

FIGS. 5 and 6 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an example process 500 for estimating tire-surface parameterization data associated with a surface on which a vehicle travels. At 502, the process 500 may include controlling a first wheel parameter associated with a first tire and a second wheel parameter associated with a second tire of a vehicle.

At 504, the process 500 may include causing a reduction in loading of the first tire relative to the second tire. In examples, an actuator may adjust the suspension of a vehicle to cause a reduction of the load carried by the first tire when compared to other tires. In examples, the actuator may directly at through the first tire, or may act through the second tire.

At 506, the process 500 may include inducing a change of at least one wheel parameter associated with the first tire. In examples, the a brake coupled to the first tire may be activated to cause rotation of the first tire to slow. In some examples, a brake controller may send one or more signals to a brake causing the brake to be activated, thereby slowing the first tire.

At 508, the process 500 may include receiving one or more signals indicative of a change of state of the vehicle. For example, the change of state may include at least one of a direction of travel of the vehicle, a speed of the vehicle, a steering angle of the vehicle, or an instability of the vehicle. In examples, the process 500 may include receiving one or more signals indicative of the speed of rotation of the first tire during the braking. For example, the vehicle may include one or more vehicle sensors, such as, for example, one or more wheel encoders configured to detect the speed of rotation of the first tire. In some examples, the one or more signals may be received by a tire-surface parameterization estimator, for example, as described herein.

At 510, the process 500 may include inducing a change of at least one wheel parameter associated with the second tire to offset the change in state. In examples, a motor coupled to the second tire may be activated to apply a torque to the second tire to offset a force caused by the first tire slowing.

The process 500, at 512, may include estimating the tire-surface parameterization data associated with the surface based at least in part on the one or more signals indicative of the loading of the first tire, the loading of the second tire, the speed of rotation of the first tire, the torque applied to the second tire, and/or the one or more signals indicative of the braking force on the first tire. For example, the tire-surface parameterization estimator may receive the signals and estimate the tire-surface parameterization data based at least in part on the signals. In some examples, the tire-surface parameterization data may include the friction coefficient between the surface and one or more of the tires of the vehicle. The friction coefficient may be the static friction coefficient or the dynamic friction coefficient.

In some examples, the tire-surface parameterization estimator may estimate the tire-surface parameterization data based on one or more of the weight of the vehicle, the vertical load on the first tire, or the one or more signals indicative of the force acting on the steering assembly and/or the suspension assembly. In some examples, the tire-surface parameterization data may be associated with a local map and/or a global map, for example, identifying locations corresponding to the tire-surface parameterization data.

In some examples, the tire-surface parameterization data may be used by the vehicle (e.g., by the vehicle systems 102) to determine performance parameters for the vehicle, such as, for example, maximum accelerations for increasing vehicle speed, maximum accelerations for reducing vehicle speed, maximum cornering speeds, etc. In some examples, the process may also include communicating data correlating the location of the vehicle and the tire-surface parameterization data via a communication network. In this example manner, the tire-surface parameterization data estimated by the vehicle may be used by other vehicles that are in communication with the communication network.

FIG. 6 is a flow diagram of an example process 600 for estimating tire-surface parameterization data associated with a surface on which a vehicle travels. At 602, the process 500 may include reducing a loading of a first tire relative to a second tire of a vehicle. In examples, the wheel loading is adjusted to meet a wheel loading difference threshold. In examples, the wheel loading difference threshold is where the first tire supports less than 10% of the total vehicle load. In examples, the wheel loading difference threshold is where the first tire supports between 10% and 15% of the total vehicle load. In examples, the wheel loading difference threshold is where the first tire supports between 15% and 20% of the total vehicle load. In examples, the wheel loading difference threshold is where the first tire supports between 2% and 3% of the total vehicle load. In examples, the wheel loading difference threshold is where the first tire supports between 1.5% and 5% of the total vehicle load. In examples, the wheel loading difference threshold is where the first tire supports between 10% and 15% of the original wheel load. In examples, the wheel loading difference threshold is where the first tire supports between 15% and 20% of the original wheel load.

At 604, the process 600 may include slowing rotation of the first tire. In examples, the rotation of the first tire may be slowed to the point that the first tire barely slips relative to the surface. In examples, the rotation of the first tire may be slowed until the first tire stops rotation. In examples, the slowing of the first tire includes applying a torque to oppose the rotation of the first tire. In examples, the slowing of the first tire includes activating a first brake coupled to the first tire. In some examples, a load cell may measure a force acting on the first tire, for example, in a longitudinal direction relative to the rotation of the first tire. In examples, the load cell may measure a force on the first wheel, an axil coupled to the first wheel, a suspension arm coupled to the first wheel, etc., or combinations thereof.

At 606, the process 600 may include causing a motor to supply torque to the second tire, to resist a change caused by activation of the first brake. In examples, the process 600 may also include causing a motor to supply torque to a third and/or a fourth tire (or more) to resist the change caused by activation of the first brake.

At 608, the process 600 may include receiving a signal indicative of the speed of rotation of the first tire upon activation of the first brake.

At 610, the process 600 may include receiving a signal indicative of the torque applied to the second tire. In examples, the process 600 may also include receiving a signal indicative of the torque applied to the third and/or fourth tire (or more).

At 612, the process 600 may include estimating tire-surface parameterization data associated with the first tire and the surface. In examples, the tire-surface parameterization data may be based at least in part on the loading of the tires, the speed of rotation of the tires, the braking force of the brake, and/or the torque of the tires.

In examples, processes 500 and 600 may be initiated in various situations. For example, the processes 500 and 600 may be initiated when the vehicle enters a roadway, a new portion of a roadway, or perceives a change in an expected condition of the roadway (e.g., observes water/puddles, shadows, etc.). In examples, the processes 500 and 600 may be initiated when the vehicle receives a new destination, changes a mode of operation (e.g., changes speed, etc.), and/or anticipates an upcoming maneuver. In examples, the processes 500 and 600 may be initiated based a time of day and/or weather conditions. For example, surface conditions may change more rapidly at transition points between day and night, night and day, and/or weather conditions. In examples, where surface conditions are more likely to change, the processes 500 and 600 may be implemented more frequently than at other times or in other conditions.

In examples, the processes 500 and 600 may be initiated based geographic locations, fleet data, and/or observed conditions. For example, surface data may be shared across the fleet, or portions thereof. In examples, the data provide by the fleet may be weighted based on time. For example, surface data for a location from a fleet member determined more recently may be weighted more than surface data for the same location from a fleet member earlier. In examples, the data provide by the fleet may be weighted based on conditions. For example, surface data for a location from a fleet member determined during a condition (e.g., temperature, weather, traffic, season, etc.) more similar to the current condition may be weighted more than surface data for the same location from a fleet member during a different condition.

In examples, the processes 500 and 600 may be initiated by a manual request. For example, a supervising system, operator, dispatcher, and/or passenger may request the processes be initiated.

In examples, the processes 500 and 600 may be initiated based on conditions of the roadway. For example, a portion of the roadway is expected to have relatively consistent characteristics. For example, the roadway may appear to be relatively smooth for a long enough distance to perform the process(es). For example, depending on a speed of a vehicle, a portion of the roadway may be free of large bumps or inconsistencies long enough to perform the process(es). In examples, the processes 500 and 600 may be performed in less than a second. In examples, the processes 500 and 600 may be performed between 500 ms and 2 seconds.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating an electrical system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

Any of the example clauses in this section may be used with any other of the example clauses and/or any of the other examples or embodiments described herein.

A: A system comprising: a wheel controller configured to: control a first wheel of a vehicle associated with a first tire according to a first wheel parameter and a second wheel of the vehicle associated with a second tire according to a second wheel parameter, the first wheel parameter or second wheel parameter comprising at least one of: a wheel loading, an amount of torque, or an amount of brake to apply to at least one of the first or second wheel; alter a first wheel loading associated with the first wheel relative to a second wheel loading associated with the second wheel such that a difference between the first wheel loading and the second wheel loading meets or exceeds a wheel loading difference threshold; induce a change of the first wheel parameter associated with the first wheel; receive a signal indicative of a change of state of the vehicle, the change of state comprising at least one of a direction of travel of the vehicle, a speed of the vehicle, a wheel slip, a steering angle of the vehicle, or an instability of the vehicle; and based at least in part on the signal, estimate tire-surface parameterization data associated with the first tire and a surface upon which the vehicle is located.

B: The system of clause A, wherein the wheel controller is further configured to: based at least in part on the signal, induce a change of a wheel parameter associated with the second wheel to oppose the change of state of the vehicle.

C: The system of clauses A or B, wherein the change of the wheel parameter associated with the second wheel to oppose the change of state of the vehicle to be below a passenger perception threshold.

D: The system of clauses A-C, wherein the wheel controller is further configured to determine, based at least in part on a state of the vehicle, a test profile, the test profile comprising one or more of the first wheel loading or the change of the first wheel parameter to induce.

E: The system of clauses A-E, wherein the wheel controller is further configured to determine the test profile based, at least in part on, a capacity of wheel parameters available to change associated with the second wheel, the capacity of wheel parameters sufficient to reduce the change of state of the vehicle to below the passenger perception threshold.

F: The system of clauses A-E, wherein the test profile further comprises an estimated change a wheel parameter associated with the second wheel to oppose the change of state of the vehicle, the estimated change a wheel parameter based at least in part on one or more of the state of the vehicle, the first wheel loading, or the change of the first wheel parameter to induce.

G: The system of clauses A-F, wherein the wheel controller is further configured to: control a third wheel parameter associated with a third tire and a fourth wheel parameter associated with a fourth tire of the vehicle; and based at least in part on the signal, induce a change of the second wheel parameter associated with the second tire, a wheel parameter associated with the third tire, and a wheel parameter associated with the fourth tire to offset the change of state of the vehicle to below a passenger perception threshold.

H: The system of clauses A-G, wherein the wheel controller is further configured to reduce the first wheel loading to at most 10% of a weight of the vehicle.

I: The system of clauses A-H, wherein the wheel controller is further configured to based at least in part on the signal, induce a change of a wheel parameter associated with the second tire to offset the change of state of the vehicle to below a passenger perception threshold.

J: The system of clauses A-I, wherein the wheel controller is further configured to: adjust an active suspension system coupled to the first wheel and the second wheel, active suspension system configured to alter the first wheel loading relative to the second wheel loading.

K: The system of clauses A-J, further comprising: one or more processors; and one or more non-transitory computer readable media having instructions stored thereon, wherein the instructions, when executed by the one or more processors cause the one or more processors to perform operations comprising: determining, based at least in part on the tire-surface parameterization, one or more of a trajectory of the vehicle, a predicted path of the vehicle, a maneuver of the vehicle, or a planned route of the vehicle.

L: The system of clauses A-K, wherein the system further comprises: a brake configured to be coupled to the first wheel and to slow rotation of the first wheel; a sensor coupled to the first wheel and configured to measure a reaction force; and a motor configured to be coupled to the second wheel and to supply torque to the second wheel; one or more processors; and one or more non-transitory computer readable media having instructions stored thereon, wherein the wheel controller is configured to: activate the brake to slow rotation of the first wheel; and cause the motor to supply torque to the second wheel, to resist at least one of a change of speed or a change of direction of travel of the vehicle caused by activation of the brake, and wherein the instructions, when executed by the one or more processors cause the one or more processors to perform operations comprising: receiving a signal indicative of a speed of rotation of the first wheel; receiving a signal indicative of the torque applied to the second wheel; and estimating tire-surface parameterization data associated with the first tire and the surface based at least in part on at least one of the signal indicative of a change of state of the vehicle, the signal indicative of the speed of rotation of the first wheel, or the signal indicative of the torque applied to the second wheel.

M: The system of clauses A-L, wherein the wheel controller is configured to activate the brake to cause the first tire to reach its static friction limit.

N: The system of clauses A-M, wherein the tire-surface parameterization estimator is configured to estimate a coefficient of friction between the first tire and the surface based as least in part on the tire-surface parameterization data.

O: The system of clauses A-N, wherein estimating the tire-surface parameterization data comprises inputting one or more of the signal indicative of a change of state of the vehicle, the signal indicative of the speed of rotation of the first tire, or the signal indicative of the torque applied to the second tire into a machine learned model and receiving, from the machine learned model, the tire-surface parameterization data.

P: The system of clauses A-O, wherein the wheel controller is configured to activate the brake to cause the first tire to stop rotating while the vehicle has a non-zero speed.

Q: The system of clauses A-P, wherein the system further comprises: a brake configured to be coupled to the second wheel and slow or prevent rotation of the second wheel; and a motor configured to be coupled to the first tire and supply torque to the first tire; one or more processors; and one or more non-transitory computer readable media having instructions stored thereon, wherein the wheel controller is configured to: activate the brake to slow or prevent rotation of the second tire; and cause the motor to supply torque to the first tire, to cause the first tire to slip relative to the surface, and wherein the instructions, when executed by the one or more processors cause the one or more processors to perform operations comprising: receiving a signal indicative of the slip of the first tire relative to the surface upon application of torque from the motor; receiving a signal indicative of the torque applied to the first tire sufficient to cause slip of the first tire relative to the surface; and estimating tire-surface parameterization data associated with the first tire and the surface based at least in part on at least one of the signal indicative of a change of state of the vehicle, the signal indicative of the slip of the first tire, or the signal indicative of the torque applied to the first tire.

R: The system of clauses A-Q, further comprising a reporting module in communication with a communication network and configured to communicate, to one or more of network-based data stores or other vehicles, data correlating a location of the vehicle and the tire-surface parameterization data via the communication network.

S: A method comprising: controlling a first wheel parameter associated with a first wheel and a second wheel parameter associated with a second wheel of a vehicle, the first wheel parameter or second wheel parameter comprising at least one of: a wheel loading, an amount of torque, or an amount of brake to apply to at least one of the first wheel or second wheel; altering a first wheel loading associated with the first wheel relative to a second wheel loading associated with the second wheel such that a difference between the first and second wheel loadings meets or exceeds a wheel loading difference threshold; inducing a change of a wheel parameter associated with the first wheel; receiving a signal indicative of a change of state of the vehicle, the change of state comprising at least one of a direction of travel of the vehicle, a speed of the vehicle, a wheel slip, a steering angle of the vehicle, or an instability of the vehicle; and based at least in part on the signal, estimating tire-surface parameterization data associated with the first wheel and a surface upon which the vehicle is located.

T: The method of clause S, further comprising, based at least in part on the signal, inducing a change of a wheel parameter associated with the second wheel to oppose the change of state of the vehicle.

U: The method of clauses S or T, wherein the change of the wheel parameter associated with the second wheel to oppose the change of state of the vehicle to be below a passenger perception threshold.

V: The method of clauses S-U, further comprising: determining, based at least in part on a state of the vehicle, a test profile, the test profile comprising one or more of the first wheel loading or the change of the first wheel parameter to induce, or a capacity of wheel parameters available to change associated with the second wheel, the capacity of wheel parameters sufficient to reduce the change of state of the vehicle to below a passenger perception threshold.

W: The method of clauses S-V, further comprising: adjusting an active suspension system coupled to the first wheel and the second wheel, the active suspension system configured to alter the first wheel loading relative to the second wheel loading.

X: The method of clauses S-W, further comprising: activating a brake to slow rotation of the first wheel; causing a motor to supply torque to the second wheel, to resist at least one of a change of speed or a change of direction of travel of the vehicle caused by activation of the brake; receiving a signal indicative of a speed of rotation of the first wheel upon activation of the brake; receiving a signal indicative of the torque applied to the second wheel; and estimating tire-surface parameterization data associated with the first wheel and the surface based at least in part on at least one of the signal indicative of a change of state of the vehicle, the signal indicative of the speed of rotation of the first wheel, or the signal indicative of the torque applied to the second wheel.

Y: The method of clauses S-X, further comprising: determining, based at least in part on the tire-surface parameterization data, one or more of a trajectory of the vehicle, a predicted path of the vehicle, a maneuver of the vehicle, or a planned route of the vehicle.

Z: A non-transitory computer readable storage medium on which instructions are stored which, when executed on a processing system, are configured for performing the method of any of the clauses S-Y.

AA: A vehicle comprising: a chassis comprising a first end and a second end opposite the first end; a first tire coupled proximate to the first end of the chassis; a second tire coupled proximate to one of the first end of the chassis or the second end of the chassis; a first motor coupled to the first tire and configured to supply rotational torque to the first tire to control rotation of the first tire; a motor coupled to the second tire and configured to supply rotational torque to the second tire to control rotation of the second tire; one or more processors; and one or more non-transitory computer readable media having instructions stored thereon, wherein the instructions, when executed by the one or more processors cause the one or more processors to perform operations comprising: reducing a first wheel loading associated with the first tire relative to a second wheel loading associated with the second tire to a wheel loading difference threshold; slowing rotation of the first tire; receiving a signal indicative of a speed of rotation of the first tire; causing the second tire to resist at least one of a change of speed or a change in direction of travel of the vehicle caused by the slowing rotation of the first tire; and based at least in part on the signal, estimating tire-surface parameterization data associated with the first tire and a surface upon which the vehicle is located.

BB: The vehicle of clause AA, wherein the instructions, when executed by the one or more processors cause the one or more processors to perform the operations further comprise receiving a signal indicative of the torque applied to the second tire, and estimating tire-surface parameterization data associated with the first tire and the surface based at least in part on the signal indicative of the torque applied to the second tire.

CC: The vehicle of clauses AA or BB, wherein the instructions, when executed by the one or more processors cause the one or more processors to perform the operations further comprise: determining, based at least in part on the tire-surface parameterization data, one or more of a trajectory of the vehicle, a predicted path of the vehicle, a maneuver of the vehicle, or a planned route of the vehicle.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
a wheel controller configured to:
control a first wheel of a vehicle associated with a first tire according to a first wheel parameter and a second wheel of the vehicle associated with a second tire according to a second wheel parameter, the first wheel parameter or second wheel parameter comprising at least one of: a wheel loading, an amount of torque, or an amount of brake to apply to at least one of the first or the second wheel;
alter, based at least in part on supplying torque to the second wheel, a first wheel loading associated with the first wheel relative to a second wheel loading associated with the second wheel such that a difference between the first wheel loading and the second wheel loading meets or exceeds a wheel loading difference threshold;
induce a change of the first wheel parameter associated with the first wheel;
receive a signal indicative of a change of state of the vehicle, the change of state comprising at least one of a direction of travel of the vehicle, a speed of the vehicle, a wheel slip, a steering angle of the vehicle, or an instability of the vehicle; and
based at least in part on the signal, estimate tire-surface parameterization data associated with the first tire and a surface upon which the vehicle is located.

2. The system of claim 1, wherein the wheel controller is further configured to:
based at least in part on the signal, induce a change of a wheel parameter associated with the second wheel to oppose the change of state of the vehicle.

3. The system of claim 2, wherein the wheel controller is further configured to determine, based at least in part on a state of the vehicle, a test profile, the test profile comprising one or more of the first wheel loading or the change of the first wheel parameter to induce.

4. The system of claim 3, wherein the wheel controller is further configured to determine the test profile based, at least in part on, a capacity of wheel parameters available to change associated with the second wheel, the capacity of wheel parameters sufficient to reduce the change of state of the vehicle to below a passenger perception threshold.

5. The system of claim 3, wherein the test profile further comprises an estimated change a wheel parameter associated with the second wheel to oppose the change of state of the vehicle, the estimated change a wheel parameter based at least in part on one or more of the state of the vehicle, the first wheel loading, or the change of the first wheel parameter to induce.

6. The system of claim 1, wherein the wheel controller is further configured to:
adjust an active suspension system coupled to the first wheel and the second wheel, active suspension system configured to alter the first wheel loading relative to the second wheel loading.

7. The system of claim 1, further comprising:
one or more processors; and
one or more non-transitory computer readable media having instructions stored thereon, wherein the instructions, when executed by the one or more processors cause the one or more processors to perform operations comprising:
determining, based at least in part on the tire-surface parameterization data, one or more of a trajectory of the vehicle, a predicted path of the vehicle, a maneuver of the vehicle, or a planned route of the vehicle.

8. The system of claim 1, wherein the system further comprises:
a brake configured to be coupled to the first wheel and to slow rotation of the first wheel; a sensor coupled to the first wheel and configured to measure a reaction force; and
a motor configured to be coupled to the second wheel and to supply torque to the second wheel;
one or more processors; and
one or more non-transitory computer readable media having instructions stored thereon,
wherein the wheel controller is configured to:
activate the brake to slow rotation of the first wheel; and
cause the motor to supply torque to the second wheel, to resist at least one of a change of speed or a change of direction of travel of the vehicle caused by activation of the brake, and
wherein the instructions, when executed by the one or more processors cause the one or more processors to perform operations comprising:
receiving a signal indicative of a speed of rotation of the first wheel;
receiving a signal indicative of the torque applied to the second wheel; and
estimating tire-surface parameterization data associated with the first tire and the surface based at least in part on at least one of the signal indicative of a change of state of the vehicle, the signal indicative of the speed of rotation of the first wheel, or the signal indicative of the torque applied to the second wheel.

9. The system of claim 8, wherein estimating the tire-surface parameterization data comprises inputting one or more of the signal indicative of a change of state of the vehicle, the signal indicative of the speed of rotation of the first tire, or the signal indicative of the torque applied to the second tire into a machine learned model and receiving, from the machine learned model, the tire-surface parameterization data.

10. The system of claim 1, wherein the system further comprises:
a brake configured to be coupled to the second wheel and slow or prevent rotation of the second wheel; and
a motor configured to be coupled to the first tire and supply torque to the first tire;
one or more processors; and
one or more non-transitory computer readable media having instructions stored thereon,
wherein the wheel controller is configured to:
activate the brake to slow or prevent rotation of the second tire; and
cause the motor to supply torque to the first tire, to cause the first tire to slip relative to the surface, and
wherein the instructions, when executed by the one or more processors cause the one or more processors to perform operations comprising:

receiving a signal indicative of the slip of the first tire relative to the surface upon application of torque from the motor;

receiving a signal indicative of the torque applied to the first tire sufficient to cause slip of the first tire relative to the surface; and estimating tire-surface parameterization data associated with the first tire and the surface based at least in part on at least one of the signal indicative of a change of state of the vehicle, the signal indicative of the slip of the first tire, or the signal indicative of the torque applied to the first tire.

11. A method comprising:

controlling a first wheel parameter associated with a first wheel and a second wheel parameter associated with a second wheel of a vehicle, the first wheel parameter or second wheel parameter comprising at least one of: a wheel loading, an amount of torque, or an amount of brake to apply to at least one of the first wheel or the second wheel;

altering, based at least in part on supplying torque to the second wheel, a first wheel loading associated with the first wheel relative to a second wheel loading associated with the second wheel such that a difference between the first and second wheel loadings meets or exceeds a wheel loading difference threshold;

inducing a change of a wheel parameter associated with the first wheel;

receiving a signal indicative of a change of state of the vehicle, the change of state comprising at least one of a direction of travel of the vehicle, a speed of the vehicle, a wheel slip, a steering angle of the vehicle, or an instability of the vehicle; and based at least in part on the signal, estimating tire-surface parameterization data associated with the first wheel and a surface upon which the vehicle is located.

12. The method of claim 11, further comprising, based at least in part on the signal, inducing a change of a wheel parameter associated with the second wheel to oppose the change of state of the vehicle.

13. The method of claim 12, wherein the change of the wheel parameter associated with the second wheel to oppose the change of state of the vehicle to be below a passenger perception threshold.

14. The method of claim 11, further comprising:
determining, based at least in part on a state of the vehicle, a test profile, the test profile comprising one or more of the first wheel loading or the change of the first wheel parameter to induce, or a capacity of wheel parameters available to change associated with the second wheel, the capacity of wheel parameters sufficient to reduce the change of state of the vehicle to below a passenger perception threshold.

15. The method of claim 11, further comprising:
adjusting an active suspension system coupled to the first wheel and the second wheel, the active suspension system configured to alter the first wheel loading relative to the second wheel loading.

16. The method of claim 11, further comprising:
activating a brake to slow rotation of the first wheel;
causing a motor to supply torque to the second wheel, to resist at least one of a change of speed or a change of direction of travel of the vehicle caused by activation of the brake;

receiving a signal indicative of a speed of rotation of the first wheel upon activation of the brake;
receiving a signal indicative of the torque applied to the second wheel; and
estimating tire-surface parameterization data associated with the first wheel and the surface based at least in part on at least one of the signal indicative of a change of state of the vehicle, the signal indicative of the speed of rotation of the first wheel, or the signal indicative of the torque applied to the second wheel.

17. The method of claim 11, further comprising: determining, based at least in part on the tire-surface parameterization data, one or more of a trajectory of the vehicle, a predicted path of the vehicle, a maneuver of the vehicle, or a planned route of the vehicle.

18. A vehicle comprising:
a chassis comprising a first end and a second end opposite the first end;
a first tire coupled proximate to the first end of the chassis;
a second tire coupled proximate to one of the first end of the chassis or the second end of the chassis;
a first motor coupled to the first tire and configured to supply rotational torque to the first tire to control rotation of the first tire;
a motor coupled to the second tire and configured to supply rotational torque to the second tire to control rotation of the second tire;
one or more processors; and
one or more non-transitory computer readable media having instructions stored thereon, wherein the instructions, when executed by the one or more processors cause the one or more processors to perform operations comprising:
reducing a first wheel loading associated with the first tire relative to a second wheel loading associated with the second tire to a wheel loading difference threshold;
slowing rotation of the first tire;
receiving a signal indicative of a speed of rotation of the first tire;
causing the second tire to resist at least one of a change of speed or a change in direction of travel of the vehicle caused by the slowing rotation of the first tire by supplying torque to the second tire; and
based at least in part on the signal, estimating tire-surface parameterization data associated with the first tire and a surface upon which the vehicle is located.

19. The vehicle of claim 18, wherein the instructions, when executed by the one or more processors cause the one or more processors to perform the operations further comprise receiving a signal indicative of the torque applied to the second tire, and estimating tire-surface parameterization data associated with the first tire and the surface based at least in part on the signal indicative of the torque applied to the second tire.

20. The vehicle of claim 18, wherein the instructions, when executed by the one or more processors cause the one or more processors to perform the operations further comprise: determining, based at least in part on the tire-surface parameterization data, one or more of a trajectory of the vehicle, a predicted path of the vehicle, a maneuver of the vehicle, or a planned route of the vehicle.

* * * * *